United States Patent [19]

Key et al.

[11] Patent Number: 5,241,360
[45] Date of Patent: Aug. 31, 1993

[54] DISTANCE MEASURING DEVICE UTILIZING SEMICONDUCTOR LASER

[75] Inventors: Claiborne M. Key; Jeffrey S. Brumfield, both of Tullahoma; Kevin R. Baker, Murfreesboro, all of Tenn.

[73] Assignee: Cubic Automatic Reveneu Collection Group, San Diego, Calif.

[21] Appl. No.: 832,095

[22] Filed: Feb. 6, 1992

[51] Int. Cl.[5] .............................................. G01C 3/08
[52] U.S. Cl. ....................................................... 356/5
[58] Field of Search ................................. 356/5, 28.5

[56] References Cited

U.S. PATENT DOCUMENTS

| | | | |
|---|---|---|---|
| 3,507,595 | 4/1970 | Schöldström | 356/5 |
| 4,093,380 | 6/1978 | White | 356/5 |
| 4,560,271 | 12/1985 | Fumio | 356/5 |
| 4,744,653 | 5/1988 | Sano et al. | 356/5 |
| 4,942,561 | 7/1990 | Ohishi et al. | 356/5 X |
| 5,082,364 | 1/1992 | Russell | 356/5 |

Primary Examiner—Mark Hellner
Attorney, Agent, or Firm—Brown, Martin, Haller & McClain

[57] ABSTRACT

A laser distance measuring device includes a semiconductor source, such as a laser diode, that produces a laser beam, preferably in the visible range. A driver selectively drives the semiconductor source at a minimum of two different driving frequencies. A laser beam receiver has a detector that produces an output signal which varies with the intensity of the received laser beam, an amplifier that amplifies the output signal of the detector, and counter means for controllably counting the number of cycles in a clock signal. A beam director selectively directs the laser beam toward an object and receives the reflected laser beam from the object, and directs the laser beam toward the receiver without traveling to the object. A microprocessor controls the driver, the counter, and the beam director.

19 Claims, 3 Drawing Sheets

DISTANCE MEASURING DEVICE UTILIZING SEMICONDUCTOR LASER

BACKGROUND OF THE INVENTION

This invention relates to electronic distance measuring equipment, and, more particularly, to a compact, light weight laser range finder utilizing a semiconductor laser preferably operating in the visible light range.

A variety of technologies are available for remotely determining the distance from a source to an object. Generally, these approaches involve emitting some type of energy toward the object and receiving a portion of the energy reflected back from the object or a reflective target (such as a corner-curb prism) placed at the object. The distance from the source to the object is determined by one of several approaches.

Three types of energy are in widespread use for distance measurement. Radio frequency signals are used to measure long distances where the desired radiation pattern from the emitter is broad, radar being an example. Ultrasonic signals are used to measure shorter distances where the desired radiation pattern from the emitter is broad, sonar being an example.

Where the distance to a well-defined object is to be measured, the use of a light beam is preferred. The light beam is emitted from a source, travels to the object or reflective target, is reflected from the object or reflective target, and returns to the emitting instrument. The light beam may be precisely defined, and the measurements are less subject to multipath interference and adverse environmental effects than are other techniques. Several different measurement approaches are available to determine distances using a light beam, including time of flight, phase difference, and code correlation techniques. For some applications, the light may be non-coherent light such as produced by light emitting diodes, and for others the light is coherent light such as produced by a laser. A variety of light-beam-based measurement instruments are available commercially, using these various techniques and light sources.

The available devices for measuring distances using the propagation of a beam of light which employ light in visible wavelengths typically are large in size, are not rugged, and require the use of a reflective target even at relatively short distances (i.e., less than a few feet) or use light sources that are too powerful for safe general applicability. By contrast, the available devices which employ light in non-visible (usually infrared) wavelengths typically use light-emitting diodes and are smaller and rugged, but suffer from the drawback that the light beam cannot be seen with the human eye. These limitations are important in the practical utilization of the distance measuring equipment. When the light used to measure distances is not visible, the user cannot be certain that the beam is reflecting from the intended surface so that the spatial resolution of the object is limited. Large, fragile gas-based lasers used in visible-light distance measuring equipment cannot be used in many applications that require the measurement device to be easily carried and moved.

As indicated, many ranging devices usually require a reflective target placed at the object to be measured to ensure that the reflected beam will have a sufficiently large amplitude for measurement and analysis. In some instances a separate reflective target may be easily provided, but in other practical applications the need for a reflective target placed at the object is a substantial detriment. For example, if a surveyor wishes to measure the height of a tower, it is highly inconvenient, and sometimes impossible, to place a reflective ranging target at the top of the tower. Conventional triangulation procedures must instead be followed.

To avoid the need for a reflective target, in some cases the power of the light source may be increased to increase the amplitude of the returned signal. This response has the limitation that the beam may become dangerous to the vision of unprotected eyes and to the skin. A high-power light source also consumes a large amount of energy, preventing it from being readily portable by a single person.

There is a need for a light-based ranging device, that preferably operates in the visible light range so that the object can be readily discerned, has excellent spatial resolution at the object, is accurate in the measured distance, requires no reflective target up to intermediate distances, is portable and rugged, has a low power requirement, and is not unduly dangerous to the operator or other person who may momentarily view the beam. The present invention fulfills this need, and further provides related advantages.

SUMMARY OF THE INVENTION

The present invention provides a light-based distance measuring device. In a preferred embodiment the device operates in the visible range so that an object whose distance is being determined can be clearly discerned by the user under many lighting conditions. The device has a distance measuring accuracy of less than $+/-$ 1 inch at distances of up to about 100 feet and comparable accuracies at larger distances, and has an object spatial resolution of about 1 inch at 100 feet. The device achieves these results with no reflective target at distances of up to about 100 feet, although the effective range without a reflective target depends upon the nature of the object begin measured. The apparatus is operable at longer distances using more highly reflective target surfaces or a reflective target. The apparatus weighs less than 5 pounds in a hand-held version, including the weight of a battery that permits the taking of hundreds of measurements on a single battery charge. The light source has a relatively low intensity that permits the ranging device to qualify under Class 3A safety standards.

In accordance with the invention, A laser distance measuring device has a source of a laser beam comprising a semiconductor laser that emits a periodically modulated laser beam, preferably in the visible light range. The source selectively emits the laser beam at a minimum of two different driving frequencies. The device further includes structure for determining the distance from the device to an object by comparing the phase difference of a ranging laser beam reflected from the object and a reference laser beam retained within the device, separately utilizing each of the driving frequencies.

The distance measuring device utilizes a semiconductor laser such as a laser diode. The selection of this type of light source is a key to the operation of the apparatus. The intensity of a semiconductor laser light source can be effectively modulated over a larger percentage range of its total power output than can more conventional lasers such as gas lasers. The ability of a detector and analysis electronics to resolve the reflected beam and obtain useful measurements without employing a reflective target depends upon having a sufficiently large difference between the maximum and minimum intensities of the reflected signal, and the present source achieves such large differences for the power level selected for the semiconductor laser.

Further in accordance with the invention, a laser distance measuring device includes source means for producing a laser beam comprising a semiconductor source that emits a laser beam, preferably in the visible light range, and driver means for selectively driving the semiconductor source at a minimum of two different driving frequencies. A receiver means for receiving a laser beam includes a detector that produces an output signal that varies with the intensity of the received laser beam, an amplifier that amplifies the output signal of the detector, and counter means for controllably counting the number of cycles in the output signal of the receiver at the driving frequencies. A beam director means selectively directs the transmitted laser beam toward an object and receives the reflected laser beam from the object in a first state, and directs the transmitted laser beam toward the receiver without traveling to the object in a second state. A control means controls the driver means, the counter means, and the beam director means. The control means is preferably embodied in a microprocessor that also analyzes the resulting information to provide a distance value.

The present invention provides an important advance in the art of light-based distance measurement. The device of the invention is a practically useful, portable instrument for accurate measurements of distance, in many cases without the use of a reflective target. Other features and advantages of the invention will be apparent from the following more detailed description of the invention, taken in conjunction with the accompanying drawings, which illustrate, by way of example, the principles of the invention.

DETAILED DESCRIPTION OF THE PREFERRED EMBODIMENT

In accordance with a preferred embodiment of the invention, a laser distance measuring device includes a semiconductor laser diode that emits a laser beam in the visible light range and a laser driver that selectively drives the laser diode at a minimum of two different driving frequencies. The device has a beam director that in a selectable first state directs the laser beam toward an object and receives the reflected laser beam from the object, and that in a selectable second state retains the laser beam within the device as a reference laser beam. A polarizer is positioned in the beam path of the laser beam between the beam director and the object to block reflections back to the laser diode. A detector is positioned to receive the reflected laser beam and the reference laser beam from the beam director. The detector produces an output signal that varies with the intensity of the impinging laser beam. An amplifier amplifies the output signal of the detector. A phase difference comparator includes a counter that controllably counts the number of cycles in the amplified output signal of the detector at the driving frequencies. A microprocessor controls the laser driver, the beam director, and the phase difference comparator, and stores the counts determined by the counter.

Figure 1:
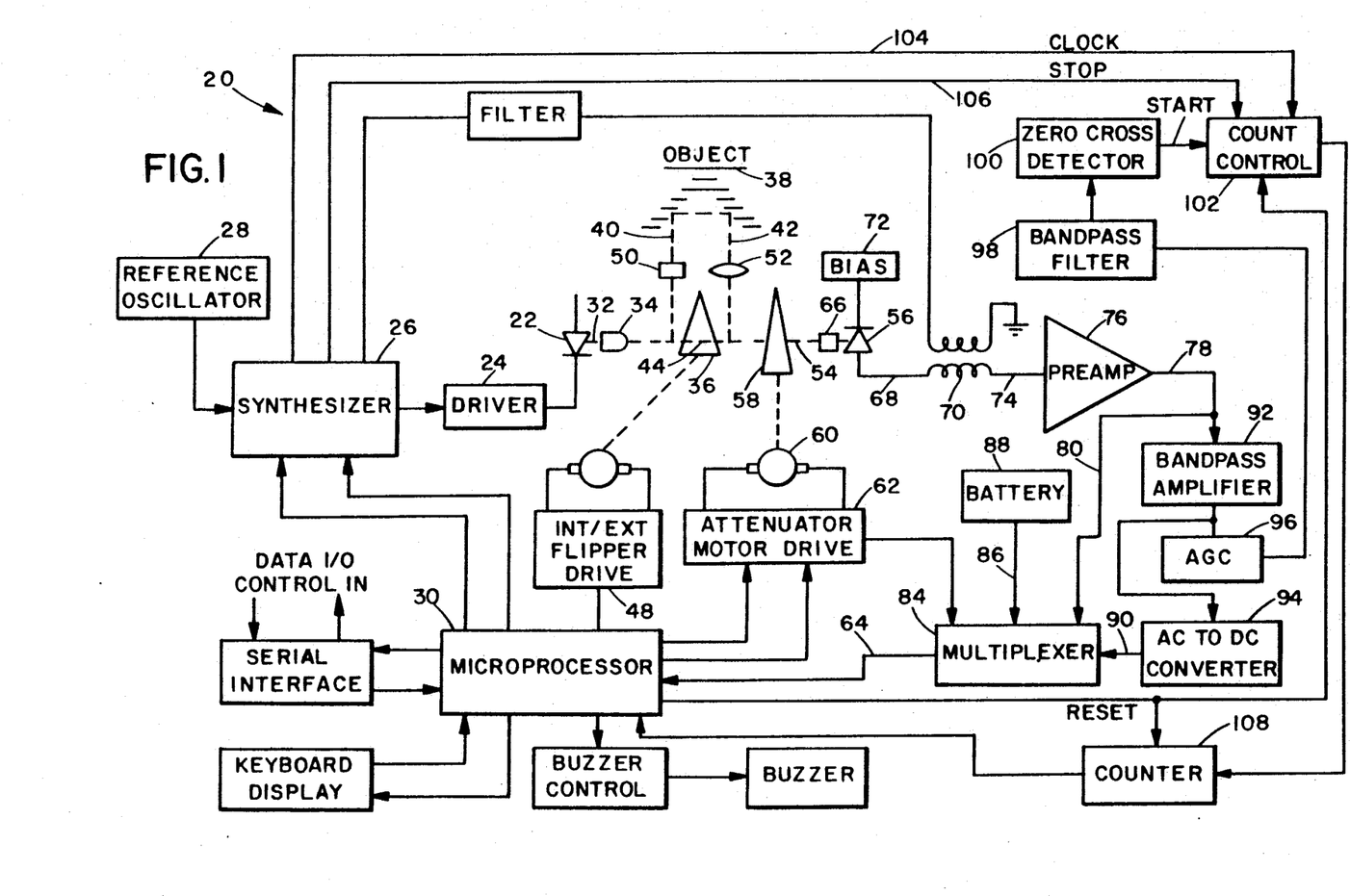
FIG. 1 is a block diagram of the distance measuring device.
Figure 2:
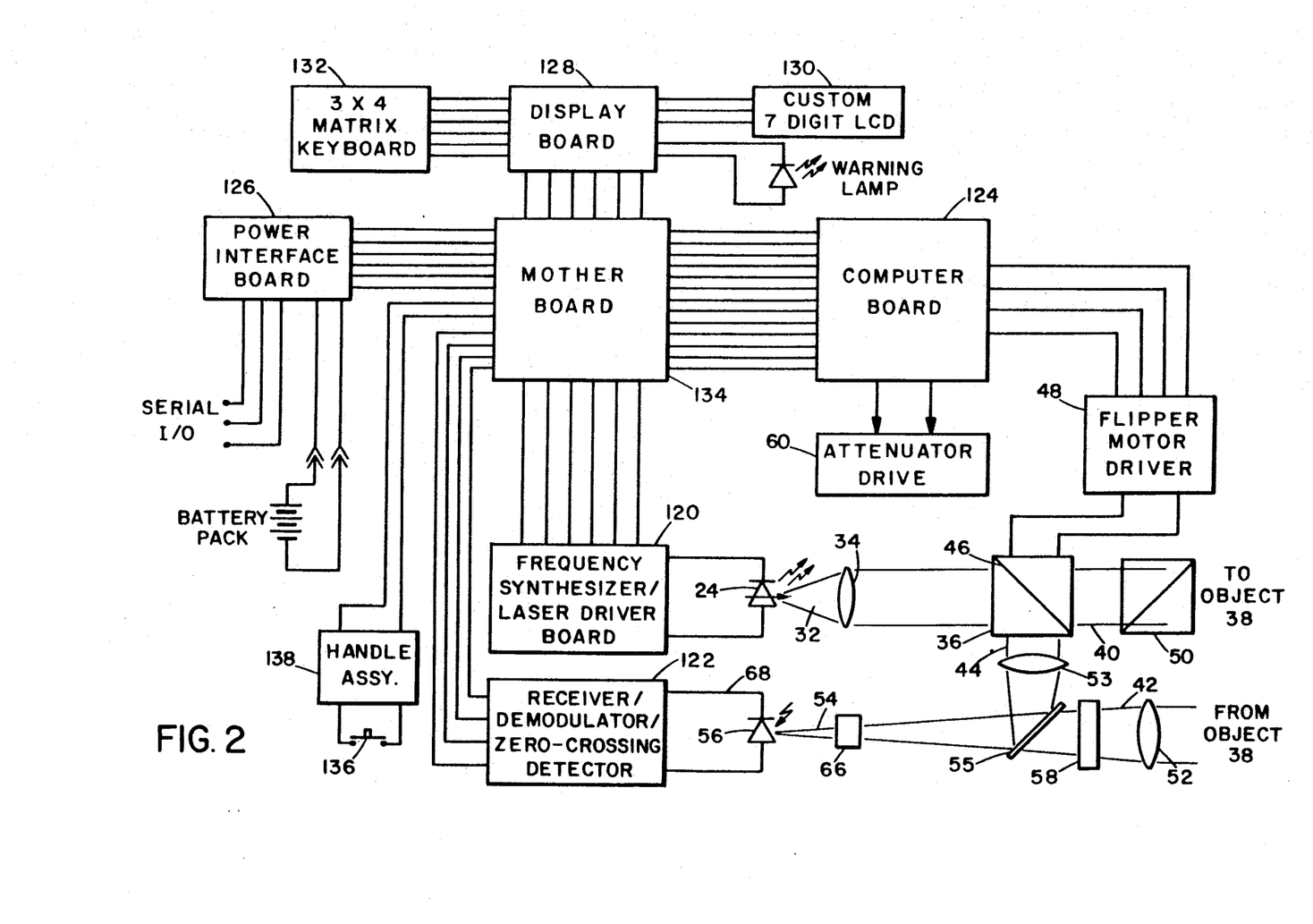
FIG. 2 is an expanded block diagram of a portion of the distance measuring device.
Figure 3:
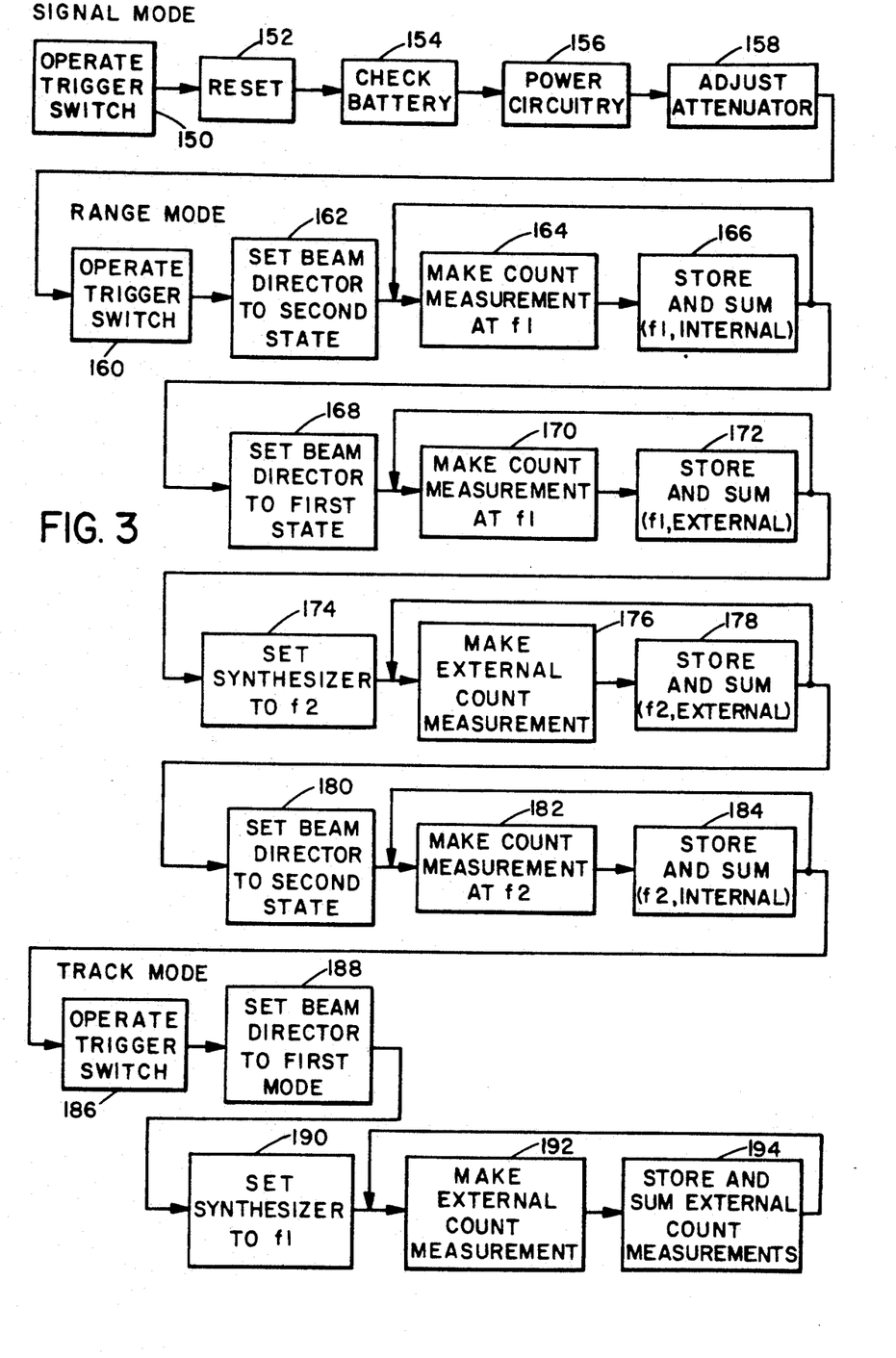
FIG. 3 is a process block diagram for the taking of a measurement using the distance measuring device.

FIG. 1 depicts a preferred embodiment of a laser distance measuring device 20 in block diagram form, and FIG. 2 shows a portion of the device 20 in more detail, and with some structural variations permitted within the scope of the invention. The sequence of operations of the device is depicted in FIG. 3.

The device 20 includes a semiconductor laser beam source operating in the visible range, preferably in the form of a laser diode 22. An operable laser diode operating at a wavelength of 670 nanometers is available from Toshiba Corp. as the Model TOLD9211. (Other currently available laser diodes are also operable, as will be other visible and non-visible laser diodes that become available in the future.) The laser diode may be contrasted with other possible sources such as a He-Ne gas tube laser. Commercial ranging instruments are available using a He-Ne laser, which is typically about 18 inches long. The commercial instrument using the He-Ne laser, including its power supply, weighs about 50 pounds. By contrast, the present instrument weighs less than 5 pounds. The He-Ne laser must be powerful, or must use a reflective target, because it cannot be modulated in amplitude to the degree that a laser diode may be modulated. A laser diode is also preferred because it has a long operating life, typically greater than 50,000 hours, as compared with a He-Ne visible gas tube laser having a typical operating life of 5,000 hours. The laser diode can be turned on and off rapidly in the gigahertz frequency range, and has a short settling time. The He-Ne laser, by contrast, can be turned on and off only on the order of about 100 times per second.

The laser diode 22 is driven by a laser driver 24. The laser driver 24 produces a temperature-compensated driving signal that modulates the intensity of the output of the laser diode 22 as a function of time, according to a square-wave signal provided to the laser driver 24 by a signal synthesizer 26. The natural output frequency of the laser diode 22 must be distinguished from the driving frequency of the laser diode. The laser diode 22 produces coherent light at a wavelength (frequency) determined by the construction of the laser diode. As noted, a preferred laser diode produces coherent red light at 670 nanometers. The output intensity of the laser diode 22 may be modulated at a different frequency, termed the driving frequency. That is, the laser diode may be turned on and off at a driving frequency that is unrelated to the output wavelength of the laser. This driving frequency signal is supplied by the laser driver 24. To avoid confusion, the natural output of the laser diode will be discussed in terms of a wavelength, and the driving frequency will be discussed in terms of a frequency.

In the presently preferred approach, two driving frequencies f1 and f2 are selectively employed. That is, the driving frequency f1 is used for part of the measurements and the driving frequency f2 is used for another part of the measurements, as will be described subsequently in detail. In a preferred embodiment, f1 is 7.4927 MHz (megahertz) and f2 is $127/128 \times (f1)$ or 7.4342 MHz.

The signal synthesizer in turn operates from a reference standard oscillator 28 that provides a standard time-based signal, in the preferred case at twice f1, or 14.9854 MHz. As will be explained more fully when the operation of the device 20 is discussed, the device 20 operates using two different driving frequencies applied in a selectable fashion. The selection of the frequencies is provided to the signal synthesizer 26 from a microprocessor 30 that coordinates and controls the overall operation of the device 20 in a manner to be described.

A light beam 32 emitted from the laser diode 22 is collimated by a collimator 34. The collimator is preferably a four-element lens having the lenses coated with a broadband antireflective coating that prevents light, and particularly red light, from reflecting back to the laser diode 22 from the collimator 34. After passing through the collimator 34, the emitted light beam 32 is selectively directed by a beam director 36, also termed a "flipper". In a first operating state, the beam director 36 directs the beam in a direction external to the device 20, toward an object 38, as a transmitted external beam 40 and receives a reflected beam 42 back from the object. In a second operating state, the beam director 36 directs the beam in a direction such that it remains internal to the device 20 as a reference beam 44 so that it may be used as a reference for phase comparison.

The beam director 36 in a preferred form includes a pivotably movable mirror 46 driven by a motor 48 controlled by the microprocessor 30. The mirror 46 is controllably removed from the beam path in the first operating state so that the light beam 34 becomes the transmitted external beam 40, and is controllably inserted into the beam path at a 45 degree angle in the second operating state to reflect the light beam 34 so that it becomes the reference beam 44. The mirror 46 is normally positioned as shown in FIG. 2 so that the laser beam does not pass out of the device 20, as a safety precaution to minimize the possibility that a person will be exposed to laser radiation.

FIGS. 1 and 2 illustrate two basic beam path arrangements, each of which is acceptable. In the configuration of FIG. 1, the laser beam is reflected through 90 degrees by the beam director 36 to form the external transmitted beam 40, and passes straight through the beam director 36 to form the internal reference beam 44. In the configuration of FIG. 2, the laser beam passes straight through the beam director 36 to form the external transmitted beam 40, and is reflected through 90 degrees by the beam director 36 to form the internal reference beam 44. The embodiment of FIG. 2 is currently preferred in a hardware implementation, but the embodiment of FIG. 1 is acceptable.

With the mirror 46 in the first operating state so that the light beam 40 is transmitted to the object 38 being measured, there is a concern that some portion of the energy of the reflected light beam 42 can travel back down the path of the light beam 40 to impinge upon the laser diode 22. Experiments have demonstrated that the frequency stability of the laser diode 22 is degraded when this occurs, causing the performance of the device to be unacceptable. To prevent reflected light from falling upon the laser diode 22, a directional light blocking structure is placed into the light beam 40. The directional light blocking structure permits the transmitted beam 40 to pass to the object 38 substantially undiminished but prevents reflected light from travelling back along the same ray path and falling upon the laser diode 22.

The preferred light blocking structure is a polarizer 50 placed into the light beam 40. The polarizer 50 permits the outgoing light beam 40 to pass undiminished in intensity. When the light beam 40 strikes the object 38 and is reflected, its polarization vector is rotated. The polarizer 50 blocks any portion of the reflected light beam having the rotated polarization from reaching the laser diode. That is, in the present device polarization is not utilized for the usual reasons, and there is no separate polarization analyzer in the system. Instead, the polarizer 50 acts to pass light in one direction but block its reflected beam from passing in the other direction.

The reflected light beam 42 typically is not converging. A converging lens 52 is placed into the ray path of the light beam 42 to focus it on the detector. Similarly, the reference light beam 44 is focused on the detector by a converging lens 53, which generally will not be of the same focal length as the lens 52.

In the preferred embodiment, the lens 52 that receives the reflected beam 44 is laterally displaced from the beam path of the transmitted beam 40. The device 22 is therefore described as having a "binocular" optical path rather than a coaxial optical path. With a binocular optical path, one who views the device from the front sees two laterally separated openings, a transmitting aperture through which the transmitted beam 40 passes and a receiving lens through which the reflected beam 42 passes, rather than a transmitting aperture coaxial with a receiving lens.

The binocular optical path arrangement is preferred for several reasons. First, it reduces the likelihood that reflected light can travel back down the optical path of the transmitted beam to the laser diode 24 to interfere with its operation in the manner discussed previously. Second, this arrangement permits the optical components to be arranged more easily in a housing. A commercial embodiment of the present invention has a housing size of about $4\frac{1}{2} \times 4 \times 8\frac{5}{8}$ inches outside envelope, and such a small size does not permit the optical components to be readily arranged in a coaxial configuration. Third, the binocular optical path arrangement minimizes optical signal feedthrough from the diode to the detector. Finally, the influence of the background on the readings is minimized with this arrangement of the optical elements.

The intensity of the light beam 54 is measured by a detector 56 placed so that the light beam falls upon the detector 56. The light beam 54 may be either the reflected light beam 42, when the beam director 36 and mirror 46 are in the first operating state, or the reference light beam 44, when the beam director 36 and mirror 46 are in the second operating state. The detector 56 is preferably an avalanche photodiode ("APD") that converts the time-varying light intensity falling upon it to a time-varying electrical signal. A preferred APD for detecting visible light at 670 nanometers is available commercially from RCA as the Model C30902E. The high-voltage power supply for the APD is temperature compensated. An avalanche photodiode is preferred because it may be operated with a high gain. Additionally, the model selected for use in the device of the invention has a small photosensitive area of about 0.020 inches diameter. This small area permits imaging and measurement of "ghost" images to be avoided through the selection of components of the optical path and careful alignment of the optical elements, as next described.

In the configurations illustrated in FIGS. 1 and 2, at least one of the beams of light is reflected to reach the detector 56. In the configuration of FIG. 1, it is the external reflected beam 42 that must be reflected at the beam director 36, while in the configuration of FIG. 2, it is the internal reference beam 44 that must be reflected. The reflector may be another beam director similar to the beam director 36. Alternatively, a stationary beam splitter 55 can be used to save space and weight. The beam splitter 55 is a piece of glass having two parallel faces, coated on one face with an antireflective coating, and placed at an appropriate reflective angle to the light beam. The beam splitter 55 permits a light beam 54 to be formed as either the reference beam 44 or the reflected beam 42.

It has been found that the beam splitter 55 must be at least about 0.7 millimeter in thickness, and is preferably about 1 millimeter in thickness. Such a thick beam splitter permits the detector, which in the preferred form has a photosensitive area of about 0.020 inches diameter, to be positioned (by careful optical alignment) so that it images only the beam formed by reflection from one of the faces of the beam splitter, preferably the front face, rather than the two beams reflected from the front face and the back face. If the beam splitter 55 is too thin, both the primary reflection from one face and a "ghost reflection" from the other face of the beam splitter are focused on the detector. The result is two images that are not in phase, and interference patterns result. These interference patterns interfere with the measurement of the phase differences in the beams.

Before striking the detector 56, the light beam 54 passes through a variable attenuator 58. The variable attenuator 58 reduces the intensity of the light beam 54 to a preselected range of intensities. This attenuation of the light beam 54 permits the detector 56 to operate in its preferred operating range, and accounts for variations in intensity of the reflected beam 44 due to variations in distance to the object 38 and the reflectivity of the object 38. The attenuator 58 may be used without altering the results because it is phase information, not intensity information, that is ultimately used in the determination of the range of the object.

The attenuator 58 may be placed so that it controllably attenuates both the reflected beam 42 and the reference beam 44, as illustrated in the embodiment of FIG. 1, or so that it controllably attenuates only the reflected beam 42, as shown in the embodiment of FIG. 2. Attenuation of the reference beam 44 typically is not required, as in the FIG. 2 embodiment, but may be necessary in some cases.

The attenuator 58 is preferably a neutral density filter wheel of graded density from nearly clear to nearly opaque, mounted to rotate on its axis. A bidirectional motor 60 turns the wheel responsive to an attenuator motor drive 62. The motor drive 62 in turn receives attenuation signals from the microprocessor 30. To generate these attenuation signals, the microprocessor 30 receives a feedback signal 64 that includes the intensity of the light measured by the detector 56, as will be described subsequently. The microprocessor 30 acts responsively to the measured light intensity by adjusting the attenuation of the light beam 54 so as to fall within predefined intensity operating limits of the detector 56.

Also before striking the detector 56, the light beam 54 is passed through an optical bandpass filter 66. The optical bandpass filter 66 removes light intensity from the light beam 54 that has a wavelength substantially different from that of the operating wavelength of the laser diode 22 (670 nanometers in the preferred embodiment). This bandpass filter 66 therefore removes stray light and background light from the light beam 54, so that the detector 56 measures only light originating in the laser diode 22.

The detector 56 produces an electrical output signal 68 that is responsive to the intensity of the light beam 54 impinging upon the detector 56. The output signal 68 is demodulated by a demodulator 70, producing a demodulated signal 74. A high voltage bias 72 is applied to the APD detector 56 through the secondary of a transformer. A signal at frequency Fr (=Ft−1829) is applied to the primary of the transformer. The approximately 4 volt sine wave is transformed into an approximately 16–20 volt sine wave which is superimposed on the high voltage bias. The APD has a nonlinear gain versus voltage characteristic. When light strikes the APD it produces output signals at frequencies (Ft+Fr) and (Ft−Fr), due to the biasing. The output signal 68 is therefore demodulated into the component (Ft+Fr), which is shunted through the bandpass network, and (Ft−Fr), which passes as the signal 74 to the preamplifier 76.

The demodulated signal 74 is amplified by a preamplifier 76 to an operable signal range for the subsequent digital electronics. The amplified signal 78 is used in two ways. First, it is used as a saturation signal 80 to detect saturation of the detector 56 and the amplifier 76. If the intensity of the output signal 68 is so great that it saturates either device, then the attenuator 58 must be operated to reduce the magnitude of the signal 68 so that subsequent signal processing can be performed.

The saturation signal 80 is multiplexed with a motor operation measurement 82 by a multiplexer 84, and supplied as the feedback signal 64 to the microprocessor 30. The microprocessor uses the saturation signal 80 to determine the need for a sufficient level of attenuation by the attenuator 58 to de-saturate the detector 56 and/or the amplifier 76, and operates the motor 60 accordingly. The microprocessor 30 uses the motor operation measurement 82 to determine whether the motor 60 has reached its limit of rotation.

The multiplexer 84 also provides in multiplexed form the voltage 86 of a rechargeable battery 88 that supplies power to the active elements of the device 20. This information is not related to the feedback control of the attenuator 58, but is conveniently supplied through the multiplexer. The microprocessor 30 monitors the battery voltage 86 to be certain that the battery is not overly depleted and that a sufficient voltage is present to provide the necessary power. The operator of the device 20 is warned when the battery voltage begins to drop into a low range.

A rectified signal intensity 90 is also provided to the microprocessor 30 through the multiplexer 84, as will be described subsequently. The rectified signal 90 is the basic feedback signal that is used to control the attenuator 58 during normal operation to ensure that the intensity of the signal 68 is within a range where the subsequent measurements may be performed. The rectified signal 90 becomes available only after sufficient attenuation is provided to de-saturate the detector 56 and the amplifier 76.

In its second use, the amplifier signal 78 is supplied to frequency counter circuitry to perform cycle counts that are in turn used to determine the distance of the object 38 from the device 20. The amplifier signal 78 is first filtered by a bandpass filter 92 to remove components having a frequency substantially different from the down-converted intermediate frequency of 1829 Hz. The output signal of the bandpass filter 92 is sent to an AC to DC converter (rectifier) 94, whose output is supplied as the rectified signal 90 to the multiplexer 84 and thence to the microprocessor 30.

The output signal of the bandpass filter 92 is also supplied to an automatic gain control 96 which adjusts the signal strength to a preselected range suitable for digital signal analysis. The output of the automatic gain control 96 is passed through a bandpass filter 98 that removes any frequency components that may be remaining after the bandpass filter 92 or that may have been introduced in the automatic gain control 96.

The filtered, amplified output signal of the detector 56 is analyzed to determine phase shifts of the external (transmitted/reflected) light beam as compared with the internal (reference) light beam, which phase shifts are proportional to the distance from the device 20 to the object 38. The phase shift is determined by counting the number of clock pulses of the reference oscillator 28, which occur during a preselected period of time.

In the preferred approach, the preselected time period during which clock pulses is counted is the time period that starts at the trailing edge of the down-converted received signal, and ends on the rising edge of a reference signal supplied directly from the synthesizer 26. The zero crossings of the signal are determined by a zero crossing detector 100. The zero crossing detector 100 is preferably a conventional Schmitt trigger. A zero crossing point of the trailing edge of the down-converted received signal is used by a count controller 102 to gate on a counter 108. An intermediate frequency reference signal 106 is supplied directly from the synthesizer 26 to the count control 102, and the rising edge of this signal 106 gates off the counter 108. The frequency-divided reference signal is f1/4096 increments or 1829.27 Hz. Also supplied to the count controller 102 from the synthesizer 26 is a clock signal 104 that is twice f1, or 14.98 MHz, which is counted by the counter 108.

The counter 108 counts the number of cycles of the clock signal at twice f1 between being gated on and being gated off. The count determined by the counter 108 is supplied to the microprocessor 30. The microprocessor 30 also resets the counter 108 and the count controller 102 to begin a new count, as needed.

The prior discussion has referred to the general system layout of FIGS. 1 and 2, including several equivalent embodiments. FIG. 2 also shows the interrelation of the circuit boards used to build up the microprocessor 30 with the optical components, as used with both embodiments. The oscillator 28, frequency synthesizer 26, and laser driver are fabricated on a driver board 120 that drives the laser diode 24. The amplifier 76, filters 92 and 98, and zero-crossing detector 100 are fabricated on a detector board 122 that receives the signal of the detector 56. A computer board 124 supports the count controller 102 and counter 108, and drives the attenuator motor 60 and the beam director motor 48. A power interface board 126 provides the power to the system from an external source, typically the battery 88 or other source. An I/O board 128 drives a display 130 and receives input from a keypad 132. A mother board 134 integrates the operation of the functions on the other boards 120, 122, 124, 126, and 128. The mother board 134 also receives the signal to take a set of measurements from a momentary contact trigger switch 136 mounted in a handle 138 of the device 20, in the preferred embodiment.

FIG. 3 illustrates the preferred process for the gathering of data using the device 20. Upon a first operation of the trigger switch 136 (numeral 150) to initiate the signal mode, the microprocessor resets the counter 108 and count controller 102 (numeral 152), checks the battery status (numeral 154), and powers the circuitry (numeral 156) to permit it to complete any transients and settle to steady values prior to the taking of measurements. The laser diode 22 is also turned on, producing a visible light spot that is visually centered on the object 38. After the laser diode is turned on, the attenuator 58 is adjusted (numeral 158) through the previously described intensity feedback loop. The attenuator 58 is further continuously adjusted through the remaining portions of the process.

A second operation of the trigger switch 136 (numeral 160) initiates the range mode wherein a single complete distance measurement is made. In the range mode, the beam director 36 is set to the second state or internal mode (numeral 162), wherein the reference beam 44 is directed to the detector 56. A series of count measurements is taken with the synthesizer 26 set to the driving frequency f1. Each count measurement (numeral 164) is the number of half-wave cycles that occur in a preselected period of time, as previously described. Each count measurement is stored in the memory of the microprocessor 30, and a sum of the individual count measurements is made to permit subsequent averaging (numeral 166). In a preferred embodiment, 512 count measurements are taken in a series. This completes a series of (f1, internal) measurements, here identified as the frequency f1 or f2, and whether the beam is the internal (reference) or external (transmitted/reflected) beam.

The beam director 36 is switched to the first state or external mode as the microprocessor 30 operates the beam director motor 48 to rotate the mirror 46 (numeral 168). The synthesizer 26 remains set to frequency f1. A series of count measurements is made on the reflected beam 42 (numeral 170) with the driving frequency at f1. Each count measurement is stored in the memory of the microprocessor 30, and a sum of the individual count measurements is made to permit subsequent averaging (numeral 172). This completes a series of (f1, external) measurements.

While keeping the beam director 36 in the first or external state, the synthesizer 26 is reset to driving frequency f2 (numeral 174). A series of count measurements is made on the reflected beam 42 (numeral 176) with the driving frequency at f2. Each count measurement is stored in the memory of the microprocessor 30, and a sum of the individual count measurements is made to permit subsequent averaging (numeral 178). This completes a series of (f2, external) measurements.

The beam director 36 is changed to the second or internal state (numeral 180) with the synthesizer 26 remaining at driving frequency f2. A series of count measurements is made on the reference beam 44 (numeral 182) with the driving frequency at f2. Each count measurement is stored in the memory of the microprocessor 30, and a sum of the individual count measurements is made to permit subsequent averaging (numeral 184). This completes a series of (f2, internal) measurements.

The four series of count measurements (f1, internal), (f1, external), (f2, external), and (f2, internal) are used in a manner to be described subsequently to determine the distance to the object.

A third operation of the trigger switch 136 (numeral 186) initiates the track mode wherein incremental changes in the position of the object may be determined more quickly than can the distance. The general approach of the track mode is to determine the change in position of the object relative to a prior measurement, rather than determine the absolute position of the object without using predetermined information.

In the track mode, the beam director 36 is set to the first or external mode (numeral 188) and the synthesizer 26 is set at driving frequency f1 (numeral 190). A series of count measurements is made on the reflected beam 42 (numeral 192) with the driving frequency at f1. Each count measurement is stored in the memory of the microprocessor 30, and a sum of the individual count measurements is made to permit subsequent averaging (numeral 194). Relatively small changes in position of the object are determined from this information, in conjunction with the information obtained in the range mode.

The track mode permits a relatively small change in the position of the object 38 relative to its prior position to be determined. Added to the prior position determined in the range mode or a prior operation of the track mode, the track mode permits a small change to be determined in less than half the time required for a full distance measurement to be made in the range mode. This capability is useful if the operator of the device 20 is attempting to approximately position a controllably movable object prior to a final determination of its distance. The track mode is therefore not used in all situations.

The distance of the object 38 from the device 20 in the range mode is determined by calculations of the microprocessor 30 as follows. First, the integer interval value of the distance of the object from the instrument is determined, and then the location within the interval is determined. This approach makes it convenient to utilize the track mode, because the integer interval is unchanged for small changes in distance in the track mode.

Average values of the f1 count measurements, F1, and the f2 count measurements, F2, are calculated. Normalized values F1N and F2N are calculated as F1/8192 and F2/8192, respectively. DelF is defined as F1N−F2N. The integer number of the interval I from the device 20 in which the object 38 is located is $$I1 = INT\ (128 \times DelF - F1N + 0.5),$$

and $$I2 = INT\ (127 \times DelF - F2N + 0.5)$$

where INT denotes the taking of an integer value. The integer number of the interval is for a 20 meter interval for I1, and a 20.15748 meter interval for I2.

The distance d of the object past the beginning of the last interval is $$d1 = F1N \times 20.00000,$$

and $$d2 = F2N \times 20.15748$$

for the two driving frequencies, respectively.

The calculated total distance D of the object from the distance measuring device is $$D1 = I1 \times 20.00000 + d1,$$

and $$D2 = I1 \times 20.15748 + d1$$

for the two driving frequencies, respectively. These two values are averaged to give a final estimated distance D as $(D1+D2)/2$.

This calculational approach is preferred. Other procedures may be used as appropriate.

The present invention therefore provides an approach to precisely measuring the distance from the measuring instrument to a object, in many cases without the need for a reflective target being placed at the object location. Although particular embodiments of the invention have been described in detail for purposes of illustration, various modifications may be made without departing from the spirit and scope of the invention. Accordingly, the invention is not to be limited except as by the appended claims.

What is claimed is:

1. A laser distance measuring device, comprising:
   source means for producing a laser beam, comprising
      a semiconductor source that emits a laser beam, and
      driver means for selectively driving the semiconductor source at a minimum of two different driving frequencies;
   receiver means for receiving a laser beam, comprising
      a detector that produces an output signal that varies with the intensity of the received laser beam,
      an amplifier that amplifies the output signal of the detector, and
      counter means for controllably counting the number of cycles in the output signal of the receiver at the driving frequencies;
   beam director means for selectively directing the transmitted laser beam toward an object and receiving the reflected laser beam from the object in a first state, and for directing the transmitted laser beam toward the receiver without traveling to the object in a second state; and
   control means for controlling the driver means, the counter means, and the beam director means.

2. The laser distance measuring device of claim 1, wherein the driver means selectively drives the semiconductor source at a minimum of two different frequencies.

3. The laser distance measuring device of claim 1, wherein the semiconductor source is a laser diode.

4. The laser distance measuring device of claim 1, wherein the source means further includes
   means for preventing light from impinging upon the solid state source.

5. The laser distance measuring device of claim 1, further including a polarizer disposed in the beam path of a laser beam directed from the semiconductor source toward the object.

6. The laser distance measuring device of claim 1, further including a controllably variable beam attenuator disposed in the beam path which is followed by a laser beam that is directed toward the detector.

7. The laser distance measuring device of claim 1, wherein the beam director means includes a variable-position mirror.

8. The laser distance measuring device of claim 1, wherein the amplifier includes a bandpass amplifier.

9. The laser distance measuring device of claim 1, wherein the counter means includes
   a zero crossing detector,
   a counter that counts zero crossings, and
   a count controller that initiates and terminates the operation of the counter.

10. The laser distance measuring device of claim 1, wherein the semiconductor source emits a beam of visible light.

11. The laser distance measuring device of claim 1, wherein the device has a binocular configuration.

12. A laser distance measuring device, comprising:
   a source of a laser beam, comprising a semiconductor laser that emits a periodically modulated laser beam;
   means for driving the source at a minimum of two different driving frequencies;
   a detector that produces an output signal that varies with the intensity of a received laser beam;
   an amplifier that amplifies the output signal of the detector;
   a beam director that in a first state directs the laser beam toward the object and directs the reflected laser beam to the detector as the external beam, an in a second state directs the reference laser beam toward the detector as the internal beam;
   a counter that controllably counts the number of cycles in a clock signal;
   means for gating the counter on and off; and
   a microprocessor that controls the operation of the device and analyzes the count data.

13. The laser distance measuring device of claim 12, further including
   means for preventing a portion of the laser beam reflected from the object back toward the device from impinging upon the semiconductor laser.

14. The laser distance measuring device of claim 13, wherein the means for preventing includes a polarizer.

15. The laser distance measuring device of claim 12, wherein the means for driving includes
   a controllable frequency synthesizer, and
   a laser driver that receives a signal from the frequency synthesizer and provides a driving signal to the semiconductor laser.

16. The laser distance measuring device of claim 12, wherein the semiconductor laser is a laser diode.

17. The laser distance measuring device of claim 12, wherein the device has a binocular configuration.

18. The laser distance measuring device of claim 12, wherein the semiconductor laser emits a visible light beam.

19. A laser distance measuring device, comprising:
   a semiconductor diode that emits a laser beam in the visible light range;
   a laser driver that selectively drives the laser diode at a minimum of two different driving frequencies;
   a beam director that in a selectable first state directs the laser beam toward an object and receives the reflected laser beam from the object, and in a selectable second state retains the laser beam within the device as a reference laser beam;
   a polarizer positioned in the beam path of the laser beam between the beam director and the object;
   a detector positioned to receive the reflected laser beam and the reference laser beam from the beam director, the detector producing an output signal that varies with the intensity of the impinging laser beam;
   an amplifier that amplifies the output signal of the detector;
   a phase difference comparator including
      a counter that controllably counts the number of cycles in a clock signal,
      means for gating the counter on and off, and
   a microprocessor that controls the laser driver, the beam director, and the phase difference comparator, and stores the counts determined by the counter.

* * * * *